United States Patent
Setlak

(10) Patent No.: US 9,582,102 B2
(45) Date of Patent: Feb. 28, 2017

(54) ELECTRONIC DEVICE INCLUDING FINGER BIOMETRIC SENSOR CARRIED BY A TOUCH DISPLAY AND RELATED METHODS

(71) Applicant: Apple Inc., Cupertino, CA (US)

(72) Inventor: Dale R. Setlak, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 122 days.

(21) Appl. No.: 14/606,462

(22) Filed: Jan. 27, 2015

(65) Prior Publication Data
US 2016/0216823 A1    Jul. 28, 2016

(51) Int. Cl.
*G06F 3/041*    (2006.01)
*G06F 3/044*    (2006.01)
*G06K 9/00*    (2006.01)

(52) U.S. Cl.
CPC ............ *G06F 3/0416* (2013.01); *G06F 3/044* (2013.01); *G06F 3/0412* (2013.01); *G06K 9/00033* (2013.01)

(58) Field of Classification Search
CPC ...... G06F 3/0416; G06F 3/0412; G06F 3/044; G06K 9/00033
See application file for complete search history.

(56) References Cited

U.S. PATENT DOCUMENTS

| 6,327,376 | B1* | 12/2001 | Harkin | G01B 7/004 356/71 |
| 2011/0102567 | A1* | 5/2011 | Erhart | G06K 9/00053 348/77 |
| 2011/0102569 | A1 | 5/2011 | Erhart | |
| 2012/0182253 | A1 | 7/2012 | Brosnan | |
| 2013/0057503 | A1* | 3/2013 | Hristov | G06F 3/044 345/174 |
| 2013/0181949 | A1* | 7/2013 | Setlak | G06K 9/0002 345/175 |
| 2013/0201134 | A1 | 8/2013 | Schneider et al. | |
| 2013/0293482 | A1* | 11/2013 | Burns | B81B 7/0006 345/173 |

* cited by examiner

*Primary Examiner* — Ariel Balaoing
(74) *Attorney, Agent, or Firm* — Allen, Dyer, Doppelt, Milbrath & Gilchrist, P.A.

(57) ABSTRACT

An electronic device may include a touch display that includes at least one display layer, and at least one transparent conductive layer thereon defining touch sensing pixels. The electronic device may also include a finger biometric sensor carried by the touch display and that may include an interconnect layer that includes transparent conductive traces, and a finger biometric sensing layer adjacent the interconnect layer and that includes an array of transparent conductive finger biometric sensing pixels capacitively coupled to the at least one transparent conductive layer of the touch display. The finger biometric sensor may also include a transparent dielectric layer between the interconnect layer and the finger biometric sensing layer, and transparent conductive vias extending through the transparent dielectric layer and coupling the array of transparent conductive finger biometric sensing pixels to respective ones of the transparent conductive traces.

38 Claims, 6 Drawing Sheets ent dielectric layer between the touch display and the finger biometric sensor. The lower transparent dielectric layer may include glass, for example. The array of transparent conductive finger biometric sensing pixels may include indium-tin-oxide (ITO), for example. The plurality of transparent conductive traces may also include indium-tin-oxide (ITO), for example. The electronic device may further include a transparent dielectric cover layer over the finger biometric sensor.

ELECTRONIC DEVICE INCLUDING FINGER BIOMETRIC SENSOR CARRIED BY A TOUCH DISPLAY AND RELATED METHODS

TECHNICAL FIELD

The present invention relates to the field of electronics, and, more particularly, to the field of finger sensors.

BACKGROUND

Fingerprint sensing and matching is a reliable and widely used technique for personal identification or verification. In particular, a common approach to fingerprint identification involves scanning a sample fingerprint or an image thereof and storing the image and/or unique characteristics of the fingerprint image. The characteristics of a sample fingerprint may be compared to information for reference fingerprints already in a database to determine proper identification of a person, such as for verification purposes.

A fingerprint sensor may be particularly advantageous for verification and/or authentication in an electronic device, and more particularly, a portable device, for example. Such a fingerprint sensor may be carried by the housing of a portable electronic device, for example, and may be sized to sense a fingerprint from a single-finger.

Where a fingerprint sensor is integrated into an electronic device or host device, for example, as noted above, it may be desirable to more quickly perform authentication, particularly while performing another task or an application on the electronic device. In other words, in some instances it may be undesirable to have a user perform an authentication in a separate authentication step, for example switching between tasks to perform the authentication.

SUMMARY

An electronic device may include a touch display that includes at least one display layer, and at least one transparent conductive layer thereon defining touch sensing pixels, and a finger biometric sensor carried by the touch display. The finger biometric sensor may include an interconnect layer comprising a plurality of transparent conductive traces and a finger biometric sensing layer adjacent the interconnect layer and that includes an array of transparent conductive finger biometric sensing pixels capacitively coupled to the at least one transparent conductive layer of the touch display. The finger biometric sensor may also include a transparent dielectric layer between the interconnect layer and the finger biometric sensing layer, and a plurality of transparent conductive vias extending through the transparent dielectric layer and coupling the array of transparent conductive finger biometric sensing pixels to respective ones of the plurality of transparent conductive traces. Accordingly, a finger biometric may be sensed during operation of the touch display.

The finger biometric sensor may extend over an entire upper surface of the touch display, for example. The plurality of transparent conductive traces may have proximal ends adjacent a peripheral edge of the interconnect layer and distal ends coupled to respective ones of the array of transparent conductive finger biometric sensing pixels. The electronic device may further include a finger sensing integrated circuit (IC) coupled to the proximal ends of the plurality of transparent conductive traces, for example.

The plurality of transparent conductive traces may have at least one trace comprising a first portion having a first effective width and a second portion having a second effective width greater than the first effective width. Each of the plurality of transparent conductive traces may have a width less than a width of each of the finger biometric sensing pixels.

The electronic device may also include a lower transparent dielectric layer between the touch display and the finger biometric sensor. The lower transparent dielectric layer may include glass, for example. The array of transparent conductive finger biometric sensing pixels may include indium-tin-oxide (ITO), for example. The plurality of transparent conductive traces may also include indium-tin-oxide (ITO), for example. The electronic device may further include a transparent dielectric cover layer over the finger biometric sensor.

A method aspect is directed to a method of making an electronic device that may include forming a touch display that includes at least one display layer, and at least one transparent conductive layer thereon defining touch sensing pixels. The method may also include forming a finger biometric sensor carried by the touch display. Forming the finger biometric sensor may include forming an interconnect layer comprising a plurality of transparent conductive traces, and forming a finger biometric sensing layer adjacent the interconnect layer and comprising an array of transparent conductive finger biometric sensing pixels capacitively coupled to the at least one transparent conductive layer of the touch display. Forming the finger biometric sensor may also include forming a transparent dielectric layer between the interconnect layer and the finger biometric sensing layer, and forming a plurality of transparent conductive vias extending through the transparent dielectric layer and coupling the array of transparent conductive finger biometric sensing pixels to respective ones of the plurality of transparent conductive traces.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to refer to like elements in different embodiments.

Figure 1:
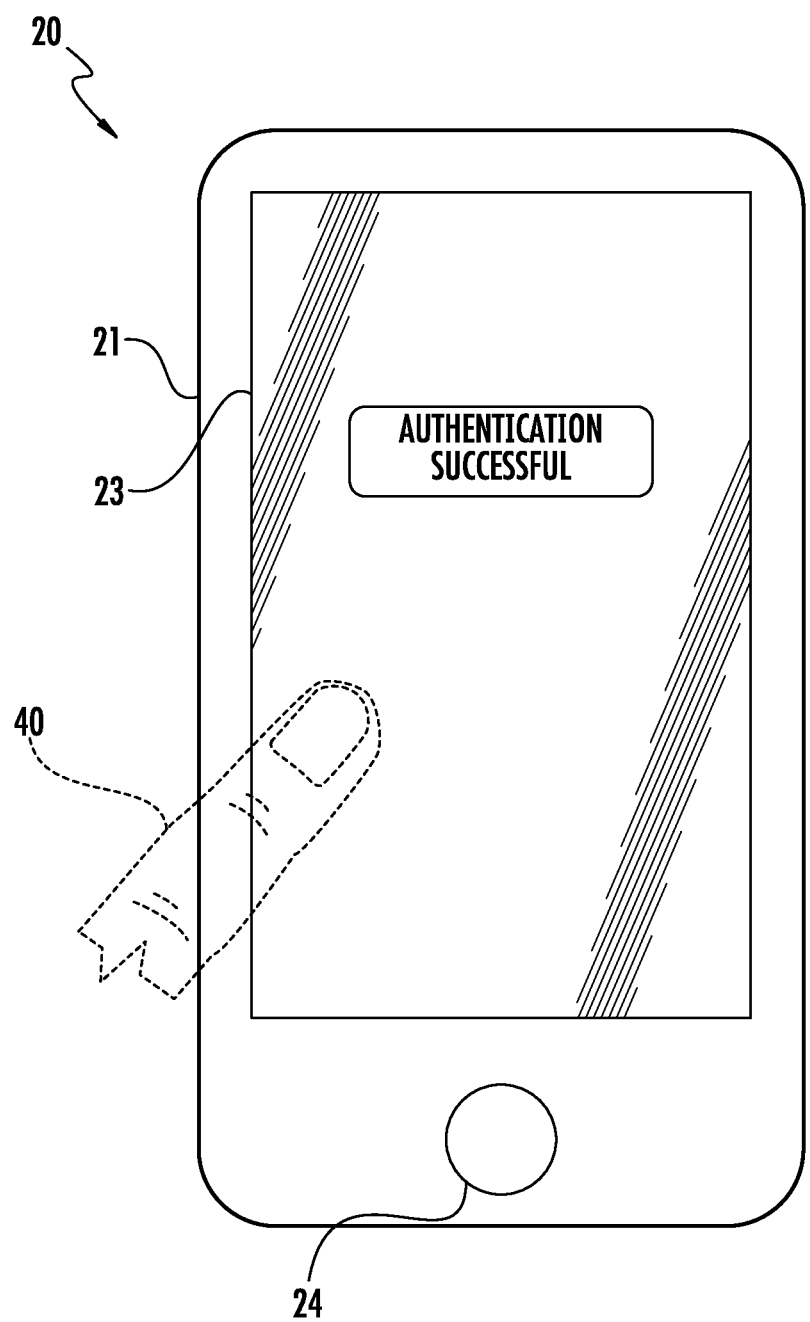
FIG. 1 is a plan view of an electronic device according to an embodiment.
Figure 2:
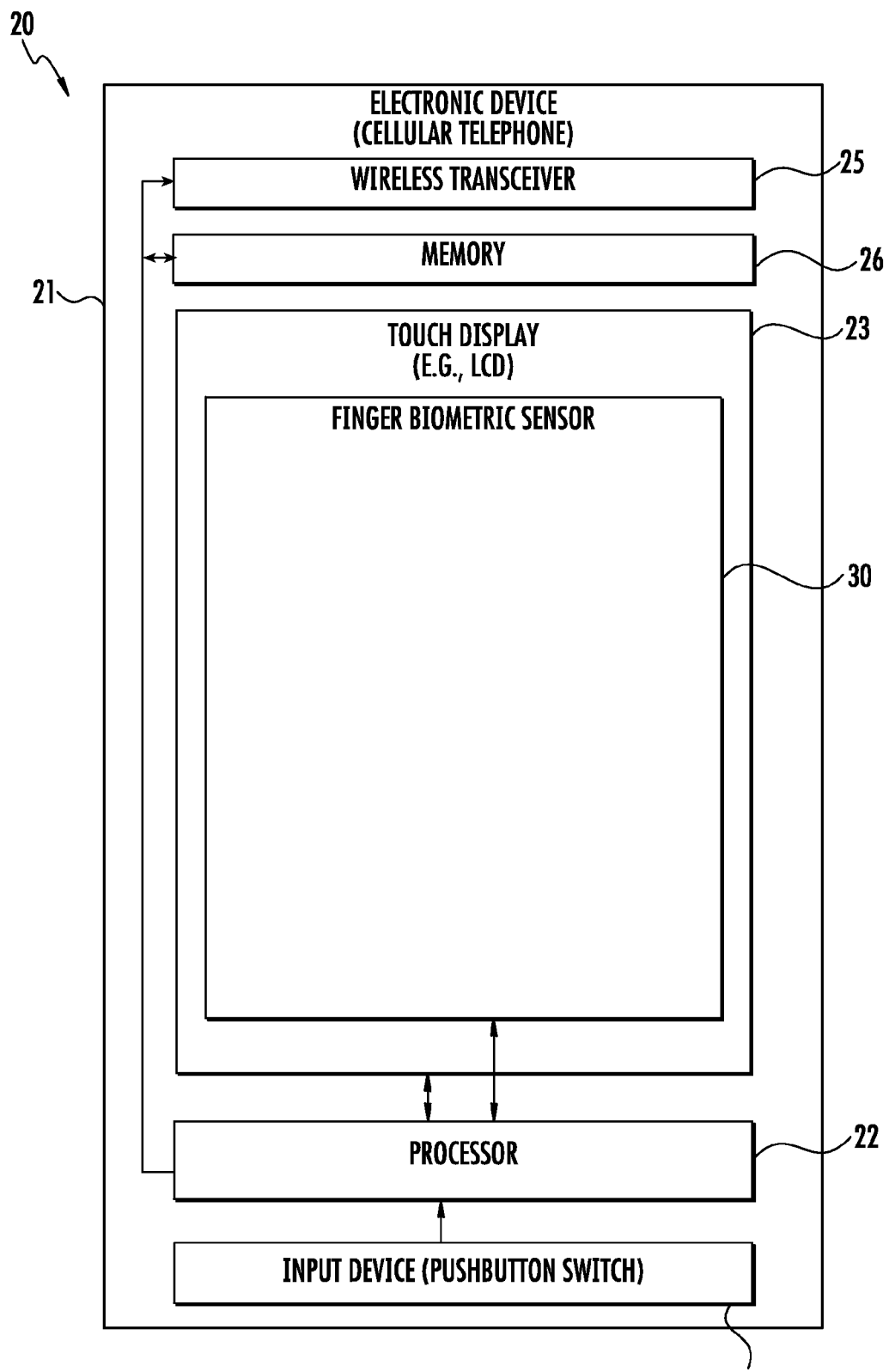
FIG. 2 is a schematic block diagram of an electronic device of FIG. 1.

Referring initially to FIGS. 1 and 2, an electronic device 20 is now described. The electronic device 20 illustratively includes a housing, for example, a portable housing 21, and a processor 22 carried by the portable housing. The electronic device 20 is illustratively a mobile wireless communications device, for example, a cellular telephone. The electronic device 20 may be another type of electronic device, for example, a tablet computer, laptop computer, etc.

A wireless transceiver 25 is also carried within the housing 21 and coupled to the processor 22. The wireless transceiver 25 cooperates with the processor 22 to perform at least one wireless communications function, for example, for voice and/or data. In some embodiments, the electronic device 20 may not include a wireless transceiver 25 or other wireless communications circuitry.

A touch display 23 is also carried by the portable housing 21 and is coupled to the processor 22. The touch display 23 may be a liquid crystal display (LCD), for example, or may be another type of touch display, as will be appreciated by those skilled in the art. Further details of the touch display 23 are described below.

A memory 26 is also coupled to the processor 22. The memory 26 is for storing finger matching biometric template data, for example. The memory 26 may store other or additional types of data, as will be appreciated by those skilled in the art.

As will be appreciated by those skilled in the art, the touch display 23 acts as both an input device and a display. As such, the touch display 23 cooperates with the processor 22 to perform one or more device functions in response to input. For example, a device function may include a powering on or off of the electronic device 20, initiating communication via the wireless transceiver 25, and/or performing a menu function based upon input to the touch display 23.

More particularly, with respect to a menu function, the processor 22 may change the touch display 23 to show a menu of available applications based upon pressing or input to the touch display. Of course, other device functions may be performed based upon input to the touch display 23. Other or additional finger-operated user input devices may be carried by the portable housing 21, for example, a pushbutton switch 24, which may be used for other and/or additional device functions as will be appreciated by those skilled in the art.

Figure 3:
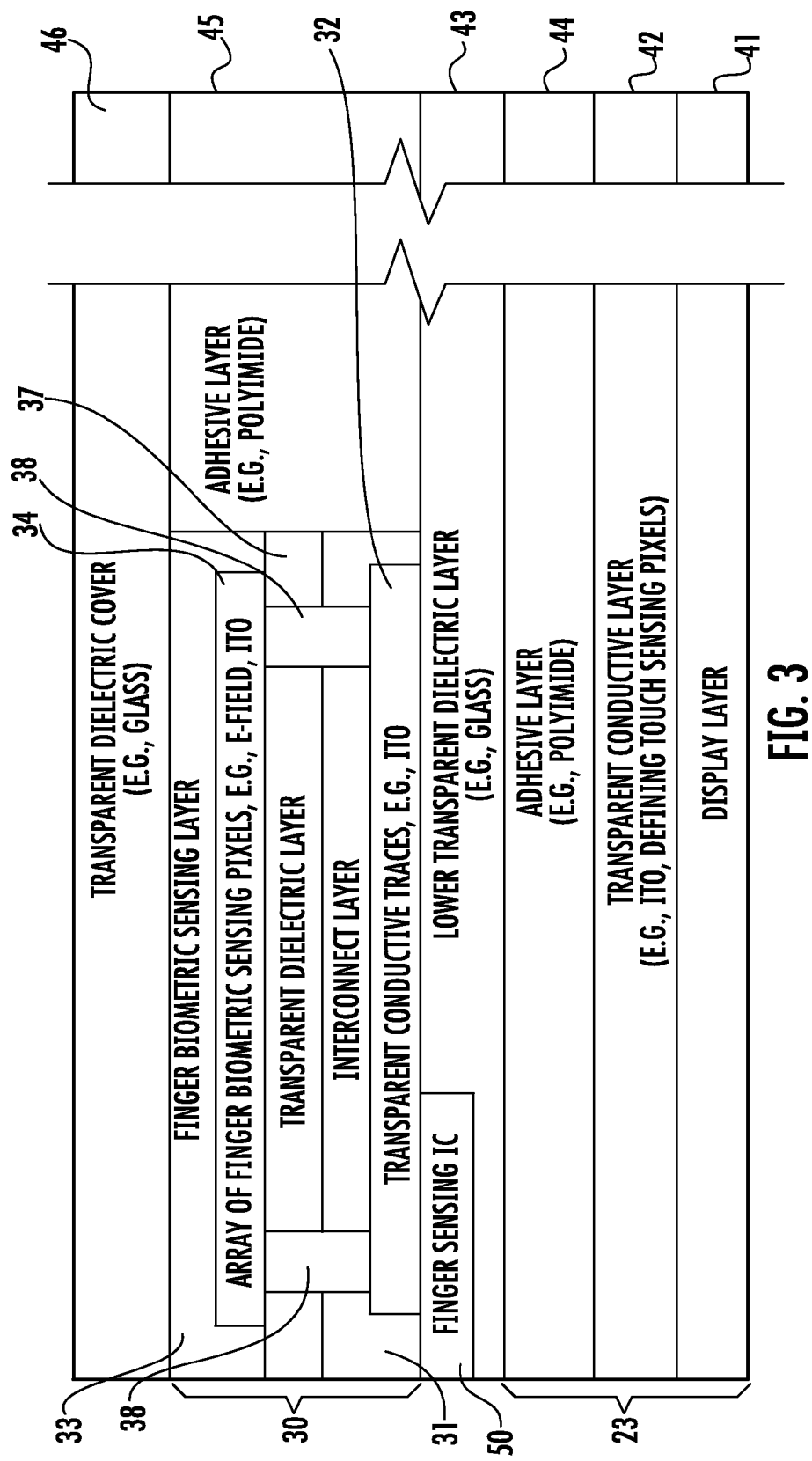
FIG. 3 is a more detailed schematic diagram of the electronic device of FIG. 1.

Referring now additionally to FIG. 3, the touch display 23 includes a display layer 41, and a transparent conductive layer 42 thereon defining touch sensing pixels, as will be appreciated by those skilled in the art. The transparent conductive layer 42 may comprise indium-tin-oxide (ITO), for example. The transparent conductive layer 42 is illustratively carried by or coupled to an upper surface of the display layer 41. However, in some embodiments, the transparent conductive layer 42 may be coupled to a lower surface of the display layer 41. Also, in some embodiments, there may be more than one transparent conductive layer 42 carried by a respective surface of the display layer 41 or within one or more display layers, as will be appreciated by those skilled in the art. Of course, there may be more than one display layer and more than one transparent conductive layer independent of one another.

A lower transparent dielectric layer 43 is carried by the touch display 23. The lower transparent dielectric layer 43 may be glass, for example. The lower transparent dielectric layer 43 is illustratively coupled to the touch display 23 by an adhesive layer 44, for example, a polyimide layer. Other and/or additional types of adhesives may be used. In some embodiments, the lower transparent dielectric layer 43 and the adhesive layer 44 may be absent.

A finger biometric sensor 30 is carried by the touch display 23. More particularly, the finger biometric sensor 30 is carried by the lower transparent dielectric layer 43 and extends partially over an upper surface of the transparent dielectric layer. Another adhesive layer 45 may be adjacent the finger biometric sensor 30 across the upper surface the touch display 23, or more particularly, the transparent dielectric layer 43.

The finger biometric sensor 30, in cooperation with the touch display 23, senses a user's finger 40 or an object placed adjacent the finger biometric sensor. When a user contacts the touch display 23, for example, during a navigation function or other touch display input, data from the user's finger 40 is acquired, for example, for finger matching and/or spoof detection, as will be appreciated by those skilled in the art.

Figure 4:
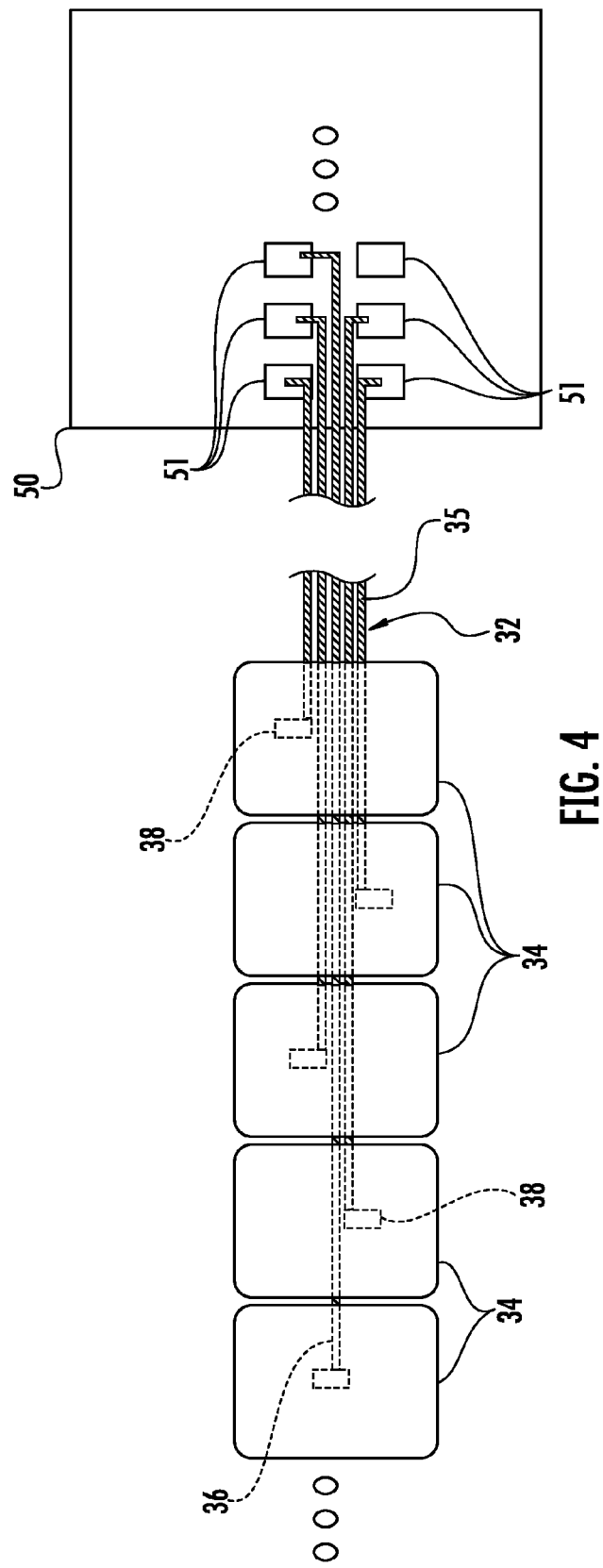
FIG. 4 is a schematic top view of the finger biometric sensor and finger sensing IC of the electronic device of FIG. 1.

Referring additionally to FIG. 4, the finger biometric sensor 30 includes an interconnect layer 31 that includes transparent conductive traces 32. The transparent conductive traces 32 may comprise ITO, for example. Of course, the transparent conductive traces 32 may be another type of material.

The finger biometric sensor 30 also includes a finger biometric sensing layer 33 adjacent the interconnect layer 31. The finger biometric sensing layer 33 includes an array of transparent conductive finger biometric sensing pixels 34 capacitively coupled to the transparent conductive layer 42 of the touch display 23. The array of transparent conductive finger biometric sensing pixels 34 may be electric field biometric sensing pixels. The array of transparent conductive finger biometric sensing pixels 34 may also comprise ITO. Of course, the array of transparent conductive finger biometric sensing pixels 34 may be another material.

Each of the transparent conductive traces 32 have proximal ends 35 adjacent an edge of the interconnect layer 31 and distal ends 36 coupled to respective ones of the array of transparent conductive finger biometric sensing pixels 34. A finger sensing integrated circuit (IC) 50 is illustratively coupled to the proximal ends 35 of the transparent conductive traces 32. More particularly, the finger sensing IC 50 has bond pads 51 that are coupled to the proximal ends 35 of the transparent conductive traces 32. The finger sensing IC 50 is positioned adjacent an edge or periphery of the transparent dielectric layer 43, and illustratively carried adjacent an upper surface of the transparent dielectric layer. Of course, the finger sensing IC 50 may be positioned elsewhere in the electronic device 20, for example, remote from the touch display 23 and finger biometric sensor 30. The finger sensing IC 50 may include medical-style active floating electrometer amplifiers for readout, and more particularly, auto-balanced bridge readouts because of their increased sensitivity.

Each of the transparent conductive traces 32 illustratively has a width that is less than a width of each of the transparent conductive finger biometric sensing pixels 34, and more particularly, in the sub-micron size range, for example. This advantageously allows for an increased number of the transparent conductive traces 32 to extend across the array of the finger biometric sensing pixels 34 without overlapping, for example.

The finger biometric sensing pixels 34 each have relatively high impedance and are much larger in size compared to the transparent conductive traces 32. This allows the transparent conductive finger biometric sensing pixels 34 to have an increased coupling to the user's finger 40 and to dominate stray pickup. Moreover, the transparent conductive traces 32 may be configured so that inactive transparent conductive traces may be used as driven shields around active transparent conductive traces. The finger biometric sensor 30 also includes a transparent dielectric layer 37 between the interconnect layer 31 and the finger biometric sensing layer 33. The transparent dielectric layer 37 serves as a dielectric buffer so that the transparent conductive traces 32 and the transparent conductive finger biometric sensing pixels 34 do not short circuit.

The finger biometric sensor 30 also includes transparent conductive vias 38 extending through the transparent dielectric layer 37 and coupling the transparent conductive finger biometric sensing pixels 34 to respective ones of the transparent conductive traces 32. The transparent conductive vias 38 illustratively extend vertically from the transparent conductive finger biometric sensing pixels 34 through the transparent dielectric layer 37 to the transparent conductive traces 32. The transparent conductive vias 38 may be polyimide, for example, but may be another material, as will be appreciated by those skilled in the art.

A transparent dielectric cover layer 46 is over the finger biometric sensor 30. The transparent dielectric cover layer 46 may be glass, for example, or may another transparent dielectric material.

As will be appreciated by those skilled in the art, the electronic device 20 drives the finger biometric sensing pixels capacitively from the touch display 23. The touch sensing pixels of the touch display 23 are used as an excitation drive plane. The configuration of the touch display 23 and the finger biometric sensor 30 described herein may have a 20-30 dB better modulation as compared to other touch screen/finger biometric sensing approaches. Moreover, operation is expected through relatively thick transparent dielectric and/or cover layers, for example, on the order of 200-300 microns. However, it is desirable that the transparent conductive traces 32 have a relatively high conductivity to support operation at megahertz frequencies.

Figure 5:
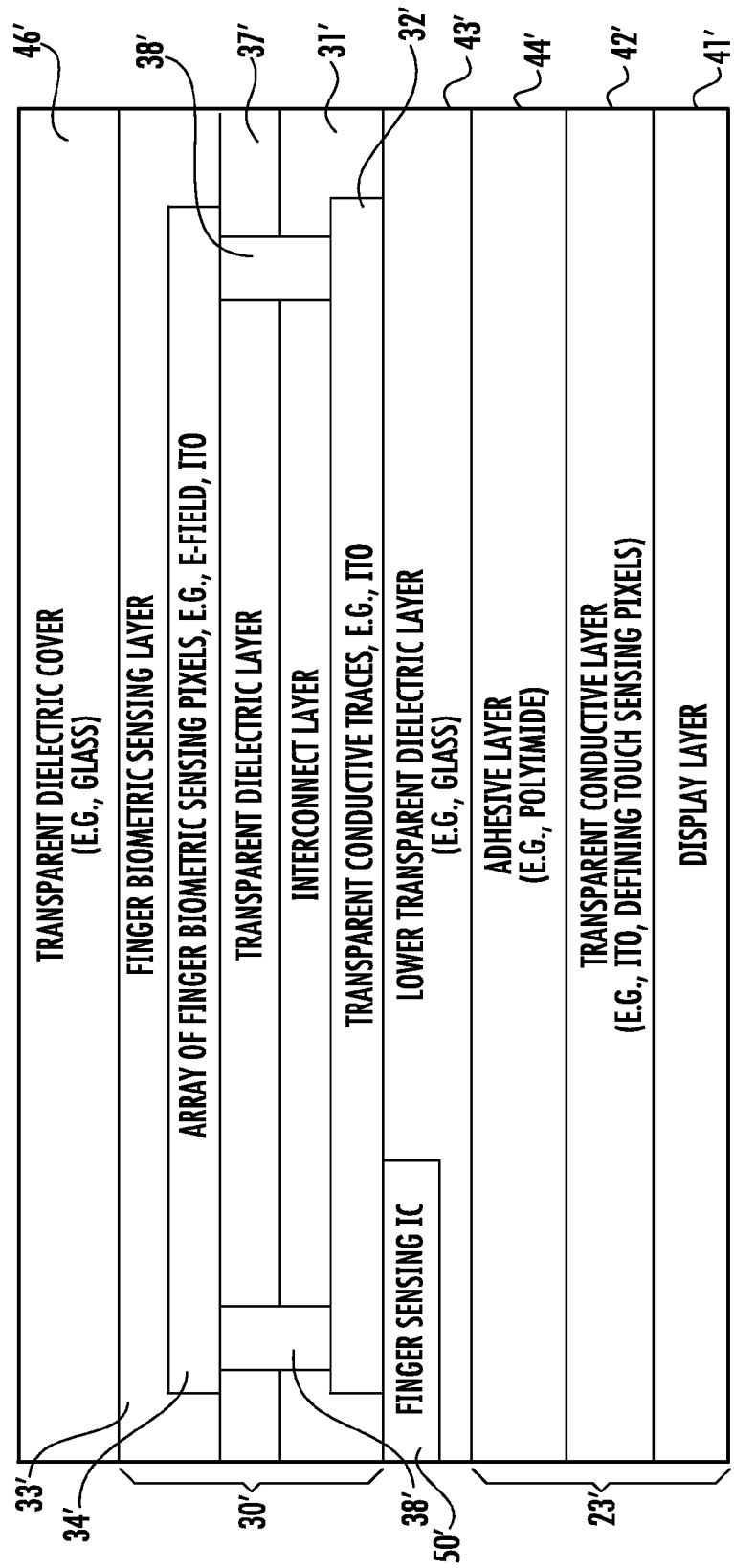
FIG. 5 is a more detailed schematic diagram of an electronic device according to another embodiment.

Referring now to FIG. 5, in another embodiment, the finger biometric sensor 30' extends over an entire upper surface of the touch display 23'. In other words, there is not an adhesive layer laterally adjacent the finger biometric sensor 30'.

Figure 6:
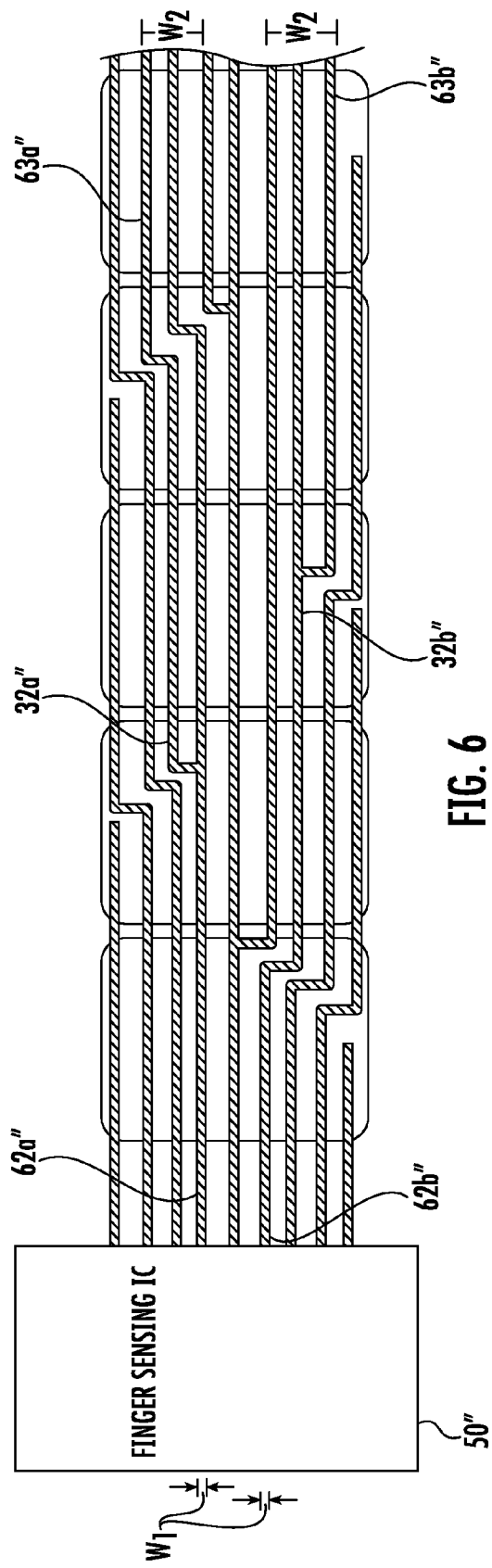
FIG. 6 is a schematic top view of the finger biometric sensor and finger sensing IC of the electronic device according to another embodiment.

Referring now to FIG. 6, in another embodiment, it may be particularly desirable for the transparent finger biometric sensing pixels that are farther away from finger sensing IC to have a lower resistance, which may increase parasitic capacitance. To reduce the resistance, some of the transparent conductive traces 32a", 32b" include a first portion 62a", 62b" each having a first effective width $W_1$ and a second portion 63a", 63b" each having a second effective width $W_2$ that is greater than the first effective width. In other words, some of the transparent conductive traces 32a", 32b" that are generally further away from the finger sensing IC 50" may split.

A method aspect is directed to a method of making an electronic device 20. The method includes forming a touch display 23 that includes a display layer 41, and at least one transparent conductive layer 42 thereon defining touch sensing pixels. The method also includes forming a finger biometric sensor 30 carried by the touch display 23. Forming the finger biometric sensor 30 includes forming an interconnect layer 31 that includes transparent conductive traces 32, and forming a finger biometric sensing layer 33 adjacent the interconnect layer and including an array of transparent conductive finger biometric sensing pixels 34 capacitively coupled to the transparent conductive layer 42 of the touch display 23. Forming the finger biometric sensor 30 may also include forming a transparent dielectric layer 37 between the interconnect layer 31 and the finger biometric sensing layer 33, and forming transparent conductive vias 38 extending through the transparent dielectric layer 37 and coupling the array of transparent conductive finger biometric sensing pixels 34 to respective ones of the transparent conductive traces 32.

It should be appreciated that while a touch display 23 that includes a display layer 41 and at least one transparent conductive layer 42 thereon defining touch sensing pixels is described herein, the touch display may have initially been a display without touch capability. In this case, the transparent conductive layer 42 may have initially been considered a display electrode to drive the display, which, as in the illustrated electronic device 20, would become adapted to provide a relatively high resolution touch sensing function in addition to finger biometric sensing.

The present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data, that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

Many modifications and other embodiments will come to the mind of one skilled in the art having the benefit of the teachings presented in the foregoing descriptions and the That which is claimed is:

1. An electronic device comprising:
a touch display comprising at least one display layer, and at least one transparent conductive layer thereon defining touch sensing pixels; and
a finger biometric sensor carried by the touch display and comprising, in a stacked arrangement,
an interconnect layer comprising a plurality of transparent conductive traces,
a finger biometric sensing layer above the interconnect layer and comprising an array of transparent conductive finger biometric sensing pixels capacitively coupled to the at least one transparent conductive layer of the touch display,
a transparent dielectric layer between the interconnect layer and the finger biometric sensing layer, and
a plurality of transparent conductive vias extending through the transparent dielectric layer and coupling the array of transparent conductive finger biometric sensing pixels to respective ones of the plurality of transparent conductive traces.

2. The electronic device of claim 1 wherein the finger biometric sensor extends over an entire upper surface of the touch display.

3. The electronic device of claim 1 wherein the plurality of transparent conductive traces have proximal ends adjacent a peripheral edge of the interconnect layer and distal ends coupled to respective ones of the array of transparent conductive finger biometric sensing pixels.

4. The electronic device of claim 3 further comprising a finger sensing integrated circuit (IC) coupled to the proximal ends of the plurality of transparent conductive traces.

5. The electronic device of claim 1 wherein the plurality of transparent conductive traces comprises at least one trace comprising a first portion having a first effective width and a second portion having a second effective width greater than the first effective width.

6. The electronic device of claim 1 wherein each of the plurality of transparent conductive traces has a width less than a width of each of the finger biometric sensing pixels.

7. The electronic device of claim 1 further comprising a lower transparent dielectric layer between the touch display and the finger biometric sensor.

8. The electronic device of claim 7 wherein the lower transparent dielectric layer comprises glass.

9. The electronic device of claim 1 wherein the array of transparent conductive finger biometric sensing pixels comprises indium-tin-oxide (ITO).

10. The electronic device of claim 1 wherein the plurality of transparent conductive traces comprises indium-tin-oxide (ITO).

11. The electronic device of claim 1 further comprising a transparent dielectric cover layer over the finger biometric sensor.

12. An electronic device comprising:
a touch display comprising at least one display layer, and at least one transparent conductive layer thereon defining touch sensing pixels;
a finger biometric sensor extending over an entire surface of the touch display and comprising, in a stacked arrangement,
an interconnect layer comprising a plurality of transparent conductive traces,
a finger biometric sensing layer above the interconnect layer and comprising an array of transparent conductive finger biometric sensing pixels capacitively coupled to the at least one transparent conductive layer of the touch display,
a transparent dielectric layer between the interconnect layer and the finger biometric sensing layer, and
a plurality of transparent conductive vias extending through the transparent dielectric layer and coupling the array of transparent conductive finger biometric sensing pixels to respective ones of the plurality of transparent conductive traces; and
a transparent dielectric cover layer over the finger biometric sensor.

13. The electronic device of claim 12 wherein the plurality of transparent conductive traces have proximal ends adjacent a peripheral edge of the interconnect layer and distal ends coupled to respective ones of the array of transparent conductive finger biometric sensing pixels.

14. The electronic device of claim 13 further comprising a finger sensing integrated circuit (IC) coupled to the proximal ends of the plurality of transparent conductive traces.

15. The electronic device of claim 12 wherein the plurality of transparent conductive traces comprises at least one trace comprising a first portion having a first effective width and a second portion having a second effective width greater than the first effective width.

16. The electronic device of claim 12 wherein each of the plurality of transparent conductive traces has a width less than a width of each of the finger biometric sensing pixels.

17. The electronic device of claim 12 further comprising a lower transparent dielectric layer between the touch display and the finger biometric sensor.

18. A method of making an electronic device comprising:
forming a touch display comprising at least one display layer, and at least one transparent conductive layer thereon defining touch sensing pixels; and
forming a finger biometric sensor carried by the touch display, forming the finger biometric sensor comprising forming, in a stacked arrangement,
an interconnect layer comprising a plurality of transparent conductive traces,
a finger biometric sensing layer above the interconnect layer and comprising an array of transparent conductive finger biometric sensing pixels capacitively coupled to the at least one transparent conductive layer of the touch display,
a transparent dielectric layer between the interconnect layer and the finger biometric sensing layer, and
a plurality of transparent conductive vias extending through the transparent dielectric layer and coupling the array of transparent conductive finger biometric sensing pixels to respective ones of the plurality of transparent conductive traces.

19. The method of claim 18 wherein the finger biometric sensor is formed to extend over an entire upper surface of the touch display.

20. The method of claim 18 wherein the plurality of transparent conductive traces are formed to have proximal ends adjacent a peripheral edge of the interconnect layer and distal ends coupled to respective ones of the array of transparent conductive finger biometric sensing pixels.

21. The method of claim 20 further comprising coupling a finger sensing integrated circuit (IC) to the proximal ends of the plurality of transparent conductive traces.

22. The method of claim 18 wherein forming the plurality of transparent conductive traces comprises forming at least one trace comprising a first portion having a first effective width and a second portion having a second effective width greater than the first effective width.

23. The method of claim 18 wherein each of the plurality of transparent conductive traces are formed to have a width less than a width of each of the finger biometric sensing pixels.

24. An electronic device comprising:
a touch display comprising at least one display layer, and at least one transparent conductive layer thereon defining touch sensing pixels; and
a finger biometric sensor carried by and extending over an entire upper surface of the touch display and comprising
an interconnect layer comprising a plurality of transparent conductive traces,
a finger biometric sensing layer adjacent the interconnect layer and comprising an array of transparent conductive finger biometric sensing pixels capacitively coupled to the at least one transparent conductive layer of the touch display,
a transparent dielectric layer between the interconnect layer and the finger biometric sensing layer, and
a plurality of transparent conductive vias extending through the transparent dielectric layer and coupling the array of transparent conductive finger biometric sensing pixels to respective ones of the plurality of transparent conductive traces.

25. The electronic device of claim 24 wherein the plurality of transparent conductive traces have proximal ends adjacent a peripheral edge of the interconnect layer and distal ends coupled to respective ones of the array of transparent conductive finger biometric sensing pixels.

26. The electronic device of claim 25 further comprising a finger sensing integrated circuit (IC) coupled to the proximal ends of the plurality of transparent conductive traces.

27. The electronic device of claim 24 wherein the plurality of transparent conductive traces comprises at least one trace comprising a first portion having a first effective width and a second portion having a second effective width greater than the first effective width.

28. The electronic device of claim 24 wherein each of the plurality of transparent conductive traces has a width less than a width of each of the finger biometric sensing pixels.

29. The electronic device of claim 24 further comprising a lower transparent dielectric layer between the touch display and the finger biometric sensor.

30. The electronic device of claim 29 wherein the lower transparent dielectric layer comprises glass.

31. The electronic device of claim 26 wherein the array of transparent conductive finger biometric sensing pixels comprises indium-tin-oxide (ITO).

32. The electronic device of claim 26 wherein the plurality of transparent conductive traces comprises indium-tin-oxide (ITO).

33. The electronic device of claim 26 further comprising a transparent dielectric cover layer over the finger biometric sensor.

34. A method of making an electronic device comprising:
forming a touch display comprising at least one display layer, and at least one transparent conductive layer thereon defining touch sensing pixels; and
forming a finger biometric sensor carried by and to extend over an entire upper surface of the touch display, forming the finger biometric sensor comprising
forming an interconnect layer comprising a plurality of transparent conductive traces,
forming a finger biometric sensing layer adjacent the interconnect layer and comprising an array of transparent conductive finger biometric sensing pixels capacitively coupled to the at least one transparent conductive layer of the touch display,
forming a transparent dielectric layer between the interconnect layer and the finger biometric sensing layer, and
forming a plurality of transparent conductive vias extending through the transparent dielectric layer and coupling the array of transparent conductive finger biometric sensing pixels to respective ones of the plurality of transparent conductive traces.

35. The method of claim 34 wherein the plurality of transparent conductive traces are formed to have proximal ends adjacent a peripheral edge of the interconnect layer and distal ends coupled to respective ones of the array of transparent conductive finger biometric sensing pixels.

36. The method of claim 35 further comprising coupling a finger sensing integrated circuit (IC) to the proximal ends of the plurality of transparent conductive traces.

37. The method of claim 34 wherein forming the plurality of transparent conductive traces comprises forming at least one trace comprising a first portion having a first effective width and a second portion having a second effective width greater than the first effective width.

38. The method of claim 34 wherein each of the plurality of transparent conductive traces are formed to have a width less than a width of each of the finger biometric sensing pixels.

* * * * *